(12) United States Patent
Roberts

(10) Patent No.: US 6,702,074 B2
(45) Date of Patent: Mar. 9, 2004

(54) BRAKE HEAT REDUCING SYSTEM

(76) Inventor: James C. Roberts, 8116 S. Ranch Rd., El Reno, OK (US) 73036

(*) Notice: Subject to any disclaimer, the term of this patent is extended or adjusted under 35 U.S.C. 154(b) by 0 days.

(21) Appl. No.: 09/905,619

(22) Filed: Jul. 13, 2001

(65) Prior Publication Data
US 2002/0005664 A1 Jan. 17, 2002

Related U.S. Application Data

(60) Provisional application No. 60/218,443, filed on Jul. 14, 2000.

(51) Int. Cl.<sup>7</sup> ............................................... B60T 13/74
(52) U.S. Cl. ...................... 188/264 R; 303/2; 303/24.1; 303/61; 188/181 A
(58) Field of Search .............................. 188/264 R, 358, 188/359, 71.6, 264 P; 303/10, 61, 2–3, 6.01, 114.1, 114.2; 60/548, 547.1–547.3, 494, 468, 424, 912, 545; 180/406; 137/113, 115.04, 115.13; 91/532, 516, 6, 391 R, 434

(56) References Cited

U.S. PATENT DOCUMENTS

| | | | |
|---|---|---|---|
| 3,524,685 A | * | 8/1970 | Harned et al. |
| 3,659,905 A | * | 5/1972 | Goulish |
| 3,666,328 A | * | 5/1972 | Williams |
| 3,731,979 A | * | 5/1973 | Mikaila ........................ 303/61 |
| 3,739,191 A | | 6/1973 | Nagazumi et al. |
| 3,760,353 A | | 9/1973 | Hassinger |
| 3,772,643 A | | 11/1973 | Dodd et al. |
| 3,778,763 A | | 12/1973 | Johns et al. |
| 3,885,324 A | | 5/1975 | Davenport et al. |
| 3,973,092 A | | 8/1976 | Breed et al. |
| 4,303,906 A | | 12/1981 | Weakley |
| 4,920,330 A | | 4/1990 | Plozner |
| 5,066,077 A | * | 11/1991 | Farr |
| 5,333,948 A | | 8/1994 | Austin et al. |
| 5,342,117 A | | 8/1994 | Price et al. |
| 5,442,333 A | | 8/1995 | Bailey |
| 5,461,362 A | | 10/1995 | Echt |
| 6,149,248 A | * | 11/2000 | Lubbers et al. .......... 303/114.1 |

* cited by examiner

Primary Examiner—Douglas C. Butler
(74) Attorney, Agent, or Firm—Fellers, Snider, et al.; Bill D. McCarthy

(57) ABSTRACT

The present invention provides a brake heat reducing system for reducing the temperature of brake components in vehicles, the brake heat reducing system cooperating with the braking system of the vehicle and having a control device having an accelerometer that is energized in response to vehicular braking and a timer relay. A modulating device has a solenoid valve connected to the timer relay and is activated by the control device in response to vehicular braking for modulating braking pressure during occurrence of vehicular braking.

9 Claims, 4 Drawing Sheets

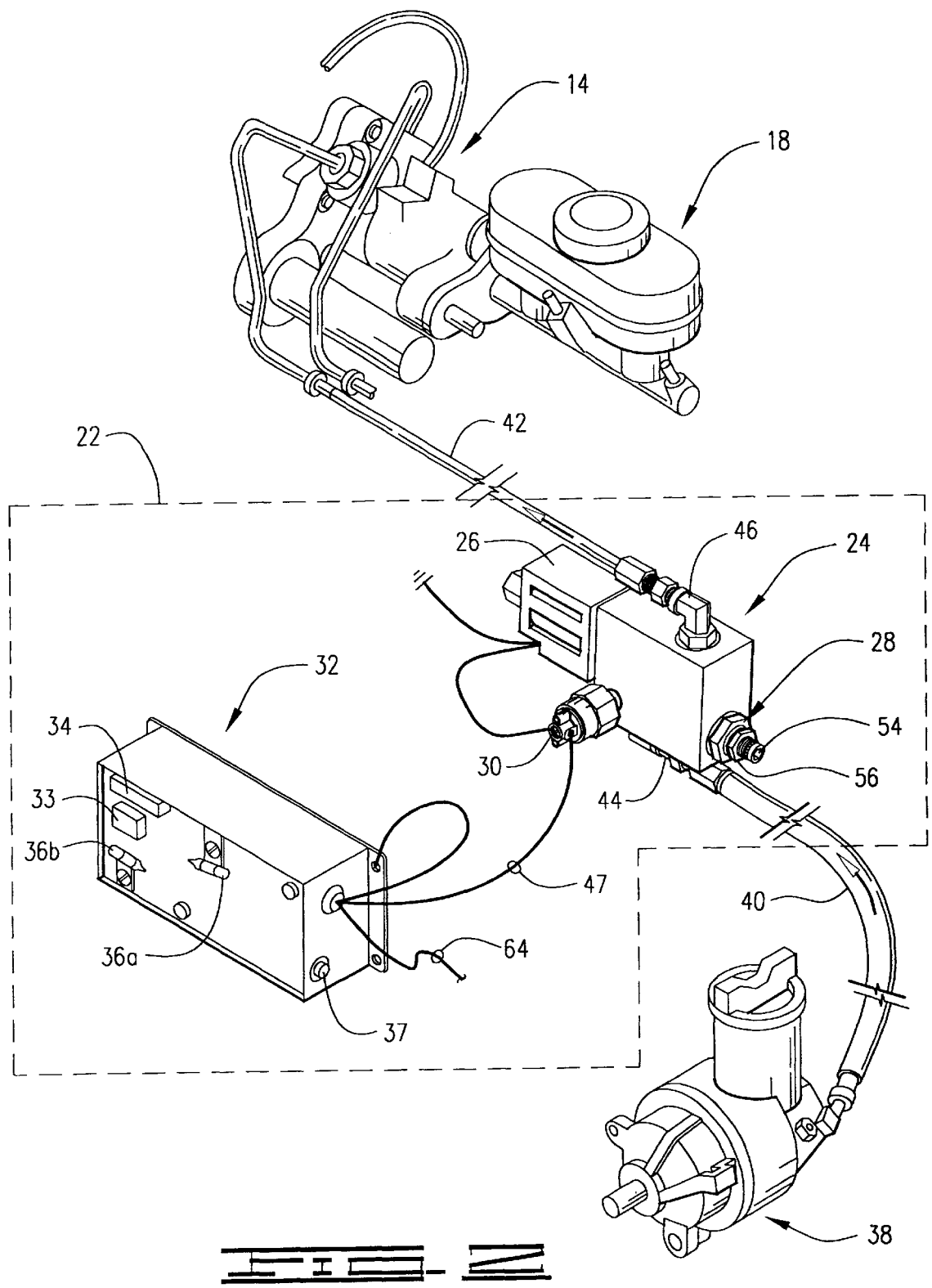

BRAKE HEAT REDUCING SYSTEM

RELATED APPLICATIONS

This application claims priority to Provisional Application Ser.No. 60/218,443 Entitled Brake Heat Reducer filed Jul. 14, 2000, and incorporated herein by reference.

FIELD OF INVENTION

The present invention relates generally to the field of brake assemblies, and more particularly but not by way of limitation, to heat dissipating braking systems.

BACKGROUND OF INVENTION

Brake components on vehicles that make frequent stops, such as intercity buses, often suffer overheating and excessive wear. The constant use of the brakes during frequent stops does not allow the rotor or drum to dissipate the heat since the brake force is reapplied before the rotor or drum can cool down. This excessive heat, which is not absorbed effectively so as to be dissipated by the rotors or drums, can retemper the drums or rotors and cause reduced braking efficiency and premature brake wear.

Prior art devices have addressed the problem of brake heat by use of air blowers directing air onto brake drums. Air can also be advantageously circulated by the use of fins attached to the wheels to direct air to the rotors or drums. These prior art devices are not widely used for a variety of reasons, but mostly because such prior art devices have not been cost effective.

There is a need for an effective and cost efficient system that will protect brake assemblies from thermal degradation due to overheat conditions.

SUMMARY OF THE INVENTION

The present invention provides a brake heat reducing system for reducing the temperature of brake components in vehicles, the brake heat reducing system cooperating with the braking system of the vehicle and having a control device that is energized in response to a braking event of the vehicle. A modulating device is activated by the control device in response to vehicular braking for modulating braking pressure during application of the vehicular braking.

The control device has a timer relay and an accelerometer, the accelerometer being responsively inclined by the braking force exerted to the vehicle, thereby activating the control device which modulates fluid pressure to the vehicle brakes, thereby allowing thermal energy to be conducted to the metal rotors or drums where the heat is dissipated more efficiently. Thus, the brake heat reducing system effects a reduction of the overall temperature of the brakes, improving the efficiency and lifetime of automotive equipment and reducing brake noise and dust.

The advantages and features of the present invention will be clear from the following detailed description and drawings when read in conjunction with the appended claims.

BRIEF DESCRIPTION OF DRAWINGS

FIG. 6 is a schematic of the electrical system of the brake heat reducing system of FIG. 1.

DETAILED DESCRIPTION

Figure 1:
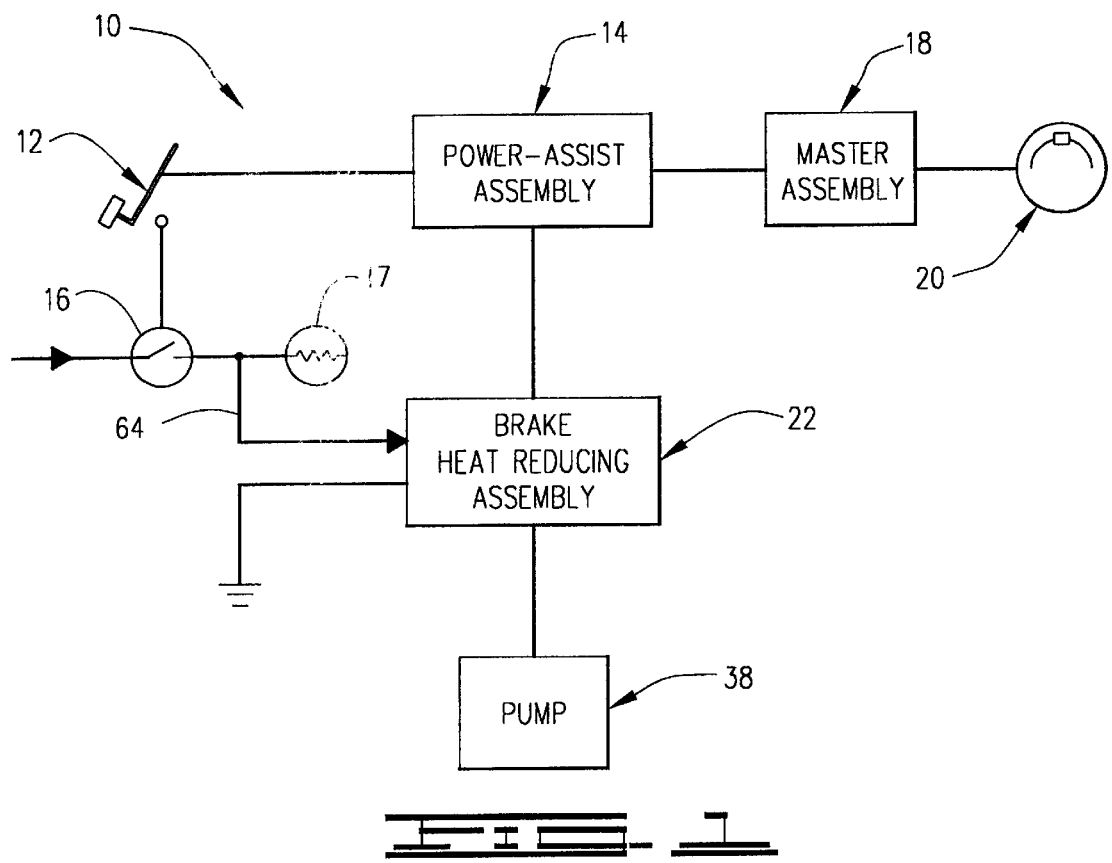
FIG. 1 is a schematic of a brake assembly of a vehicle, the braking system having a brake heat reducing system constructed in accordance with the present invention.

Referring generally to the drawings, and in particular to FIG. 1, depicted therein is a typical vehicle brake system 10 modified to incorporate the brake heat reducing system of the present invention. The braking system 10 has some familiar components including a brake pedal 12 that is mechanically linked to a hydraulic power-assist assembly 14 and to a switch 16 that is connected to a stop light 17. The power-assist assembly 14 is mechanically linked to a master cylinder 18, for instance by a piston with a rod that extends from the brake pedal 12 to the power-assist assembly 14. The master cylinder 18 is linked to a wheel braking assembly 20 to cause braking action as well known to those skilled in the art.

Figure 2:
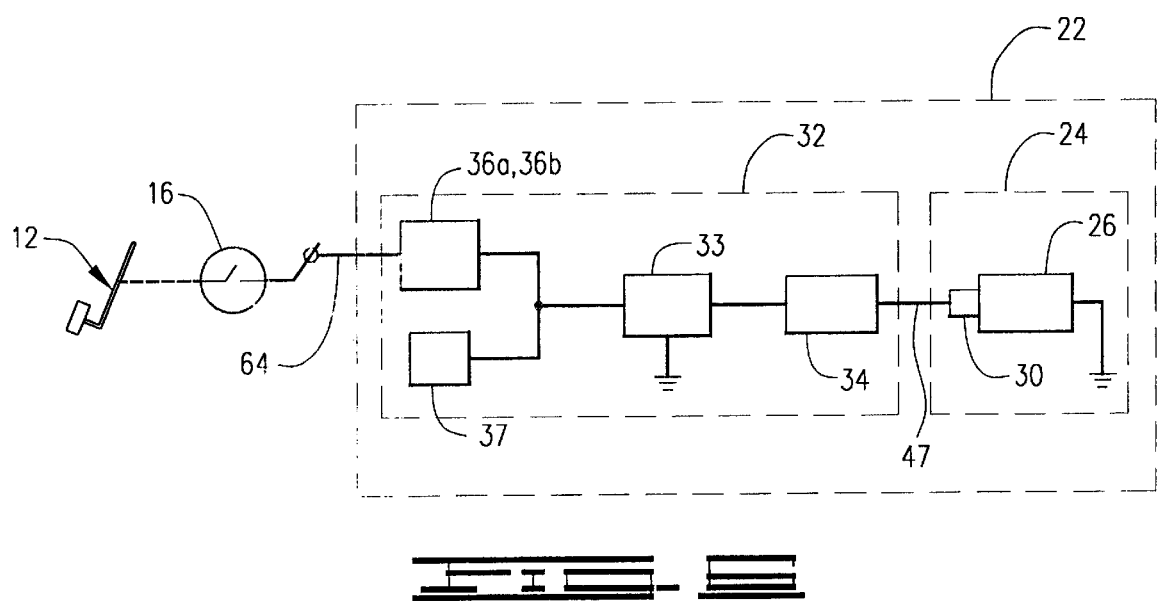
FIG. 2 is a partially detailed, isometric view of the brake heat reducing system of FIG. 1.

The present invention provides a brake heat reducing system 22 which is, as shown in FIG. 2, electrically activated when the brake pedal 12 mechanically activates the switch 16. The brake heat reducing system 22 has a modulating device 24 that has a solenoid valve 26, a calibration valve 28 and a safety switch 30. The brake heat reducing system 22 also has a control device 32 that has a timer relay 33, a delay switch 34, a pair of accelerometers 36a, 36b and a test device or switch 37. The power-assist assembly 14 is powered by a pump 38, which in the embodiment shown in FIG. 2 is the hydraulic steering pump of the vehicle. The power-assist assembly 14 serves to enhance the braking effort from the brake pedal 12 to the brake master cylinder 18 and thus to the wheel braking assembly 20.

The control device 32 is electrically connected through the safety switch 30 to the solenoid valve 26. The modulating device 24 receives pressurized fluid from the pump 38 and interacts with the power-assist assembly 14 which controls mechanical pressure to the master cylinder 18. The master cylinder 18 forces a wheel assembly piston (not shown) to expand frictional material against a rotor or drum that is connected to the wheel so the movement of the vehicle is slowed.

The power steering pump 38 provides fluid pressure to power the vehicle's power steering gear (not shown). The power steering pump 38 also supplies fluid pressure to the power-assist assembly 14, giving a mechanical advantage between the brake pedal 12 and the piston of the master cylinder 18, depending on the braking required and the pressure applied to the brake pedal 12. The more power assistance required, the higher the pressure in a first fluid line 40 from the pump 38 to the modulating device 24 and in a second line 42 from the modulating device 24 to the power-assist assembly 14.

Figure 3:
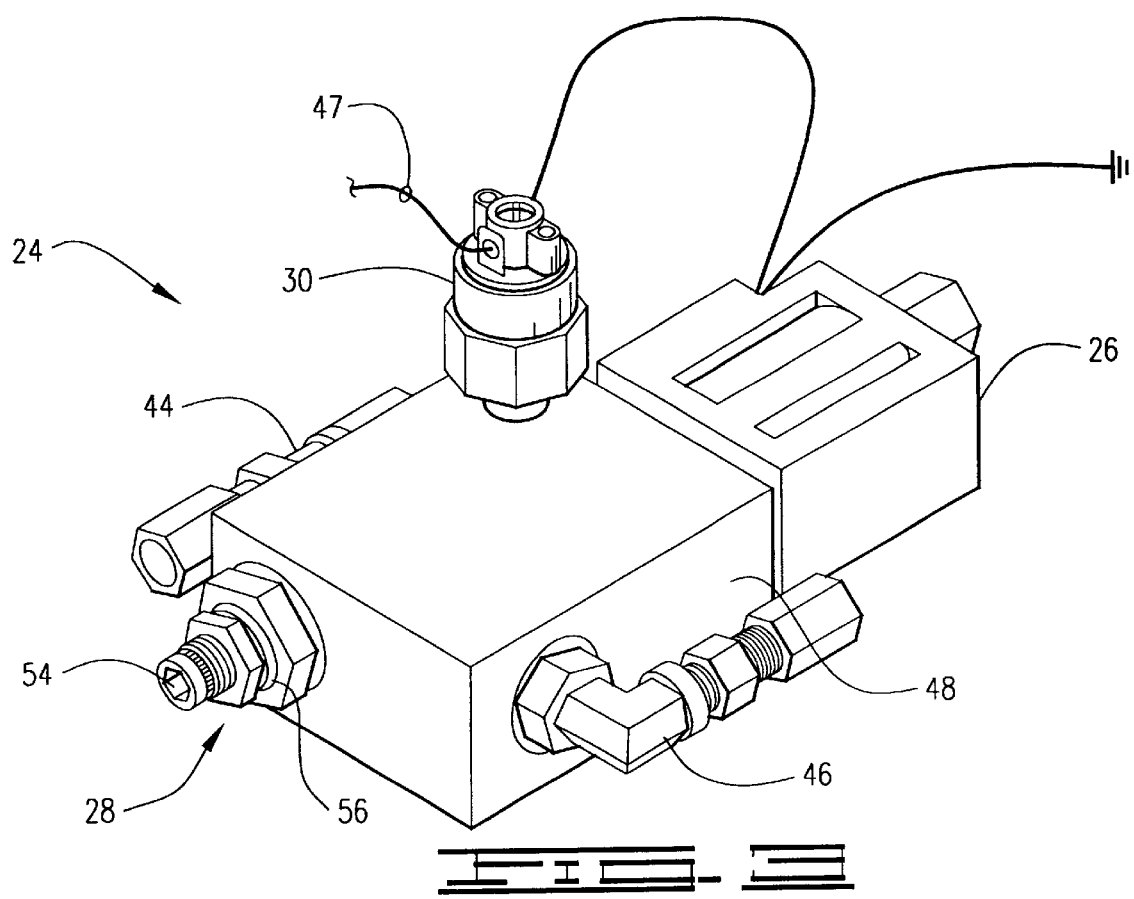
FIG. 3 is an isometric view of the modulating device of the brake heat reducing system shown in FIG. 1.

FIG. 3 shows the modulating device 24 including the solenoid valve 26, the calibration valve 28 and the safety switch 30 all of which are adjacent to each other and can be encapsulated to make up the modulating device 24. The modulating device 24 is interposed in the pressurized fluid lines 40, 42 between the pump 38 and the power-assist assembly 14 and modulates the braking effort to the master cylinder 18. The solenoid valve 26 modulates fluid flow in the second line 42 by closing the fluid flow from the first fluid line 40 and internally by-passing it through the calibration valve 28 which causes the power-assist assembly 14 to modulate the movements of the master cylinder 18 and wheel braking assembly 20.

Fluid enters the modulating device 24 from the pump 38 through the first fluid line 40 (shown in FIG. 2) through an inlet 44 and passes through various ports and canals before it exits the modulating device 24 through an outlet 46. The outlet 46 is in fluid communication with the power-assist assembly 14.

The solenoid valve 26, which can be a Vickers Model Number SV580012DWS available from Air Hydraulic Corporation of Oklahoma City, Okla., receives an electrical controlling signal 47 from the control device 32 and modulates the fluid pressure sent to the power-assist assembly 14 through line 42. The solenoid valve 26, disposed in a housing or body member such as Model Number AHC1536-1 available from Air Hydraulic Corporation of Oklahoma City, Okla., receives the electrical controlling signal 47 from the control device 32 and modulates the pressure of the fluid that exits the modulating device 24 by outlet 46. This fluid flows to the power-assist assembly 14 through the second line 42.

The normally closed safety switch 30, which can be a PDI Model Number PMHA available from Pressure Devices Incorporated of Union City, S.C. will deactivate (open contact) when it senses a pressure from line 40 through the inlet 44 that is above the desired set point and will de-energize the solenoid valve returning the power-assist assembly 14 to the original brake pressure. The safety switch 30 has an adjustment mechanism, such as a spring, that is adjusted to establish the set point.

Figure 4:
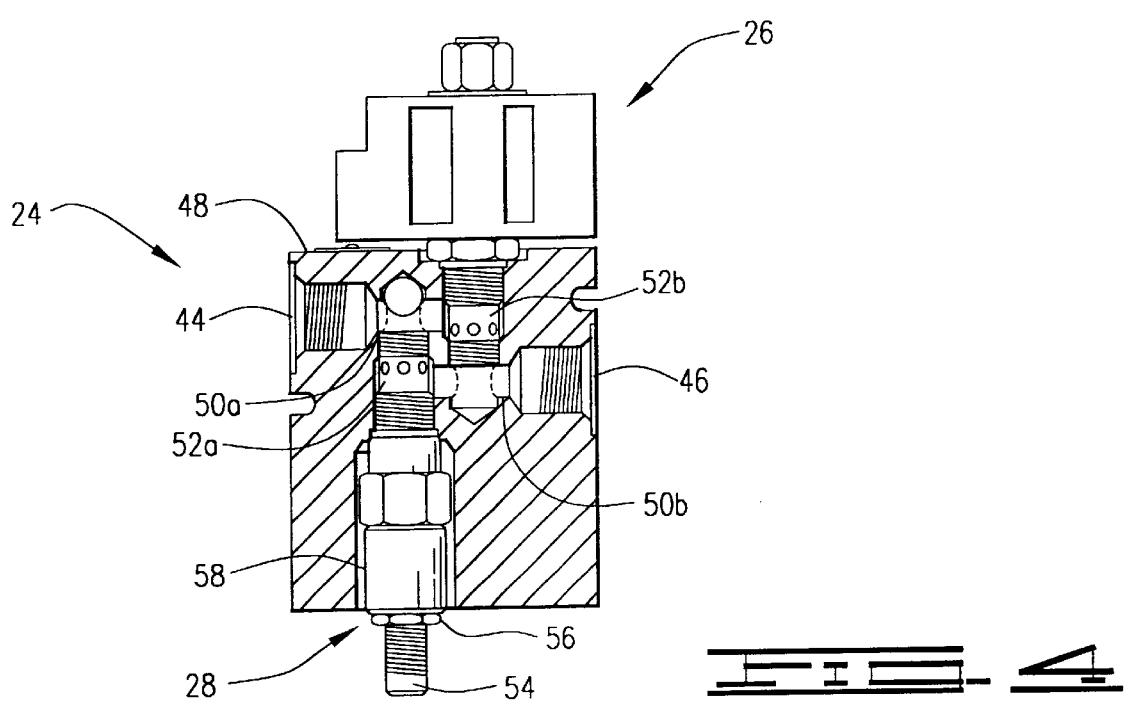
FIG. 4 is a partial cross-sectional top view of the modulating device of FIG.

FIG. 4 shows a partial cut away of the modulating device 24 including the solenoid valve 26 which is enclosed in the body member 48 with the inlet 44 and the outlet 46 and internal canals 50a, 50b and ports 52a, 52b to modulate or stop the flow of fluid from the inlet 44 and force the fluid through the port 52a and through the calibration valve 28 that restricts the pressure to the outlet 46.

The calibration valve 28, which can be a Vickers Model Number FCV710S0NVF available from Air Hydraulic Corporation of Oklahoma City, Okla., has an adjustment screw 54 and a locknut 56. The calibration valve 28 has a relief valve cartridge 58 such that the adjustment screw 54 adjusts the flow of fluid through the valve cartridge 58. The calibration valve 28 is adjusted to accommodate the desired flow rate of fluid through body member 48. The solenoid valve 26, the calibration valve 28 and the housing canals 50a, 50b are large enough to accommodate the flow rate of fluid from the pump 38 as required for a particular type of vehicle installation. Thus, the provision of the calibration valve 28 permits calibrating the fluid flow rate to match the fluid flow needs of a particular power-assist assembly 14.

The calibration valve 28 works in conjunction with the solenoid valve 26. The activated solenoid valve 26 can shut off the flow completely and force the fluid through the calibration valve 28 which acts as an alternative route for the fluid and allows the fluid to bypass internally inside the body member 48 through port 52a. This results in a reduction in the flow of fluid in the second line 42 and consequentially a reduction in pressure to the power-assist assembly 14. For example pressure in the power-assist assembly 14 may be reduced from 100 percent to 80 percent when the solenoid valve 26 is repetitively energized by the control device 32, which is preset for activation at a desired deceleration as discussed more below.

Figure 5:
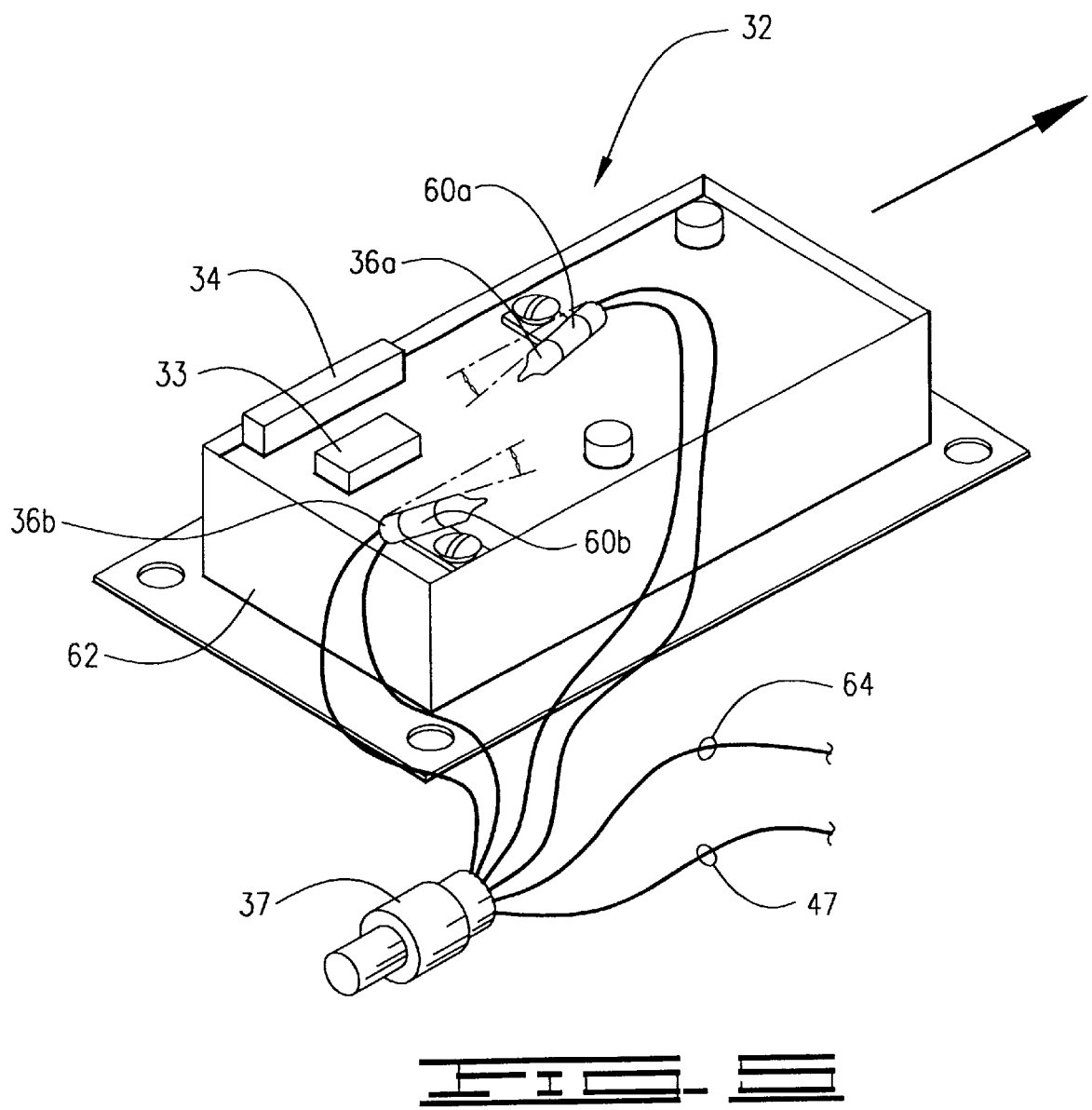
FIG. 5 is an isometric view of the control device of the brake heat reducing system of FIG. 1.

FIG. 5 shows the control device 32 which includes the timer relay 33, the delay switch 34, the accelerometers 36a, 36b and the test switch 37. The timer relay 33, which can be Model Number 4400H available from Sunrise Systems of Blanchard, Okla., is set to repetitively send pulsating off-on electric current to the solenoid valve 26 at a rate depending on the desired length of time for the energized and non-energized cycle portions to last.

Suitable accelerometers 36a, 36b can be Carlton Bates mercury switches Model Number GC350-7600 available from GC Electronics of Rockford, Ill. As noted below, only one of the mercury switch accelerometers 36a, 36b is connected, and the one selected for connection is set to respond when the vehicle is subjected to a braking force of approximately 0.17 g. The accelerometers 36a, 36b are of a selected length and diameter to be disposed at a determined angle, such as 18° for a 0.17 g force, to force the mercury against the contacts to close the electrical circuit until the force is removed.

The delay switch 34, which can be a Siemens ST7CV5D 12, is set to deactivate the electrical current to the solenoid valve 26 if the energized time of the timer relay 33 is greater than a predetermined set time. That is, the delay switch 34 serves to limit the amount of time that the braking fluid pressure can be interrupted or modulated. For example, the delay switch 34 can have a set point of about 0.2 seconds, and if this time period is exceeded, no signal is sent to the solenoid valve 26 which deactivates the normally open solenoid valve 26 and returns the power-assist assembly 14 to normal braking conditions.

The test switch 37 can activate the timer relay 33 in the absence of a braking force to simulate a braking force and activate the connected mercury switch accelerometer 36a or 36b. The test device 37 is preferably a spring loaded device designed so that the off mode is the normal mode.

The accelerometers 36a, 36b are supported by brackets 60a, 60b on the control unit body 62 at a predetermined angle relative to horizontal so that the connected accelerometer 36a or 36b is activated when the braking force reaches about 0.17 g. In practice, it has been found that the angle of disposition will normally vary between about 12 and 22 degrees, with a nominal value being about 18 degrees. Of course, it will be appreciated that this angle is a function of the size and shape of the accelerometers 36a, 36b, and the angular value can be determined by one skilled in the art.

The two accelerometers 36a, 36b are mounted in opposite arrangements so that the control device 32 can be oriented in either of two directions, as the configuration of the installation hardware in a particular vehicle may require. For example, the control device 32 can be placed on the right or left side of a vehicle and only a selected one of the accelerometers 36a, 36b will be electrically connected. The accelerometers 36a, 36b are preset for an anticipated deceleration of the vehicle, such as discussed above for 0.17 g braking force, and activated when there is approximately a 18 degree slope.

FIG. 6 shows a schematic of the electrical system for the brake heat reducing system 22. The diagram shows the activation event as movement of the brake pedal 12 that by mechanical linkage activates the switch 16 that sends an energizing electrical signal 64 to the stop light 17. This energizing electrical signal 64 also travels to the accelerometers 36a, 36b which then activate the timer relay 33, the delay switch 34 and the safety switch 30.

One skilled in the art will be aware of other connectors that can be used in the embodiment of the brake heat reducing system 22. The control device 32 can be installed separately and can be in close proximity to the modulating device 24 as may be desired. If desired, the control device 32 and the modulating device 24 can be enclosed within a common housing so long as the control device 32 is disposed to be inclined when the vehicle is braked. It will be noted that the length of the fluid lines 40, 42 can be determined as required by the existing braking system and the installation and operational requirements.

As discussed above, the power-assist assembly 14 is activated by depressing the brake pedal 12 which activates the switch 16. The switch 16 also causes electric current to pass to the mercury switch accelerometers 36a, 36b of the control device 32. When the connected mercury switch accelerometer 36a or 36b closes, the timer relay 33 repetitively sends electric current through the delay switch 34 to the solenoid valve 26. This results in pulsating fluid pressure to the power-assist assembly 14, thereby modulating braking force to the wheel braking assembly 20. Thus, the present invention dissipates some of the excessive heat produced by the frictional component of the vehicle's braking system by producing a modulation of the pressure between the frictional component. Heat is allowed time to be conducted to the rotor or drum in waves, allowing the heat energy to be dissipated more efficiently, reducing the overall temperature of the brakes.

In the brake heat reducing system 22 described herein, it has been noted that the pressurized fluid flows from the pump 38 through the first line 40 to the inlet 44 of the modulating device 24, through the modulating device 24, and on to the outlet 46 of the modulating device 24. The fluid then proceeds through the second line 42 to the power-assist assembly 14 which is mechanically linked to the master cylinder 18. In a typical vehicle installation for the modulating device 24, fluid travels at about 10 gallons per minute into the modulating device 24 and travels at about 6 gallons per minute out of the modulating device 24 when the modulating device is activated. The amount of fluid would vary depending on the size of the pump and other components as well as the distances involved and the braking environment.

The safety switch 30 is provided to deactivate the modulating device 24 when a triggering condition is encountered, such as under extreme braking of the vehicle. The safety switch 30 is a pressure activated switch that has normally closed electrical contacts that will open when the safety switch 30 senses pressure above a predetermined set point. When the safety switch 30 incurs pressure above its set point, the electrical contacts of the safety switch 30 open, breaking electrical continuity with the solenoid valve 26. Since the solenoid valve 26 is normally open (in absence of current thereto), the pressure through the brake heat reducing system 22 is normalized; and the power-assist assembly 14 will operate without intervention of the brake heat reducing system 22.

That is, under maximum braking conditions, the pressure of the pump 38 can exceeds the set point of the safety switch 30 which stops electrical current to the solenoid valve 26, permitting fluid to pass straight through from inlet 44 to outlet 46 without any restriction or modulation in flow. For example, the normal first line 40 pressure can be 400 psi., and 100 percent braking pressure can be 1500 psi. The safety switch 30 can be set to open contact at 1000 psi and when opened, the power-assist assembly 14 will operate without modulation and will be subjected to the full operating pressure up to the maximum 1500 psi. Other activating events and pressure set points can be set to activate or deactivate the safety switch 30 as one skilled in the art would understand.

In practice, it has been found that a preferred resulting braking cycle is about one third of a second energized (modulated braking force) and about two thirds of a second non-energized (full braking force) for each second of a braking event. This is achieved by the synchronization of the electrical and mechanical systems of the present invention. In the embodiment described herein, this is achieved by fluid pressure to the wheel braking assembly 20 at one hundred (100) percent applied braking force for approximately two thirds of the time of the braking event; and less than one hundred percent (preferably about eighty percent) of the applied braking force for the remaining one third of the time of the braking event. Thus, during the one third time of the braking cycle (that is, during the time of modulated braking force), the solenoid 26 is energized for about 0.2 second and the solenoid 26 is deactivated (not energized) for about 0.1 second, for a total time of about 0.3 second for the solenoid cycle. This results in about 3 solenoid cycles per second of the energizing time (modulated baking force) for the brake heat reduction system 22 described herein.

It is clear that the present invention is well adapted to carry out the objectives and to attain the ends and advantages mentioned as well as those inherent therein. While the present invention has been described in varying detail for purposes of the disclosure, it will be understood that numerous changes can be made which will readily suggest themselves to those skilled in the art and which are encompassed within the spirit of the invention disclosed in the above text and in the accompanying drawings.

I claim:

1. A brake heat reducing system for use in conjunction with a vehicular braking system activated by pressurized fluid during a braking event, comprising:

a control device that is energized in response to the deceleration of the vehicle during the braking event, the control device including an accelerometer that responds to the deceleration of the vehicle during the braking event; and a modulating device activated by the control device to modulate the pressurized fluid to the braking system during the braking event, the modulating device comprising:

a body member having a fluid inlet and a fluid outlet interconnected by a fluid canal for pressurized fluid passage; and a solenoid valve supported by the body member and communicating with the fluid canal to selectively reduce fluid passage therethrough to modulate the passage of pressurized fluid to the fluid outlet; and a safety switch supported by the body member and communicating with the fluid canal to selectively deactivate the solenoid valve in response to the pressurized fluid reaching a predetermined pressure value, and wherein the control device comprises a timer relay connected for pulsating off-on current to the solenoid valve.

2. The brake heat reducing system of claim 1 wherein the modulating device further comprises:

a calibration valve supported by the body member and communicating with the fluid canal to calibrate the flow rate of the pressurized fluid therethrough.

3. The brake heat reducing system of claim 2 wherein the control device further comprises:

timer means responsive to activation of the accelerometer for limiting the time of modulation of the pressurized fluid.

4. The brake heat reducing system of claim 3 wherein the control device further comprises:

a test device to bypass the accelerometer for selective temporary activation of the modulating device to simulate a braking event.

5. A brake heat reducing system for use in conjunction with a vehicular braking system activated by pressurized fluid for braking the vehicle during a braking event, comprising:

a control device that is energized in response to deceleration of the vehicle during the braking event, the control device comprising:

an accelerometer that responds to the change in horizontal inclination of the vehicle during the braking event;

a timer relay that is activated in response to the accelerometer upon the occurrence of the braking event; and a modulating device to modulate the pressurized fluid, comprising:

a body member having a fluid inlet and a fluid outlet interconnected by a fluid canal for pressurized fluid passage;

a solenoid valve connected to the timer relay and supported by the body member communicating with the fluid canal to selectively reduce fluid passage therethrough to modulate the pressurized fluid to the fluid outlet in response to the timer relay; and a safety switch supported by the body member and communicating with the fluid canal to selectively deactivate the solenoid valve in response to the pressurized fluid reaching a predetermined pressure set value.

6. The brake heat reducing system of claim 5 wherein the modulating device further comprises:

a calibration valve supported by the body member and communicating with the fluid canal to calibrate the flow rate of the pressurized fluid therethrough.

7. The brake heat reducing system of claim 6 wherein the control device further comprises:

a test device connected to the solenoid valve to bypass the accelerometer for selective temporary activation of the modulating device to simulate a braking event.

8. The brake heat reducing system of claim 7 wherein the control device has a second accelerometer in a position that mirrors the position of the first accelerometer so that a selected one of the first and second accelerometers can be connected to the modulating device.

9. The brake heat reducing system of claim 8 wherein the modulating device modulates the pressurized fluid by reducing the pressure of the pressurized fluid for approximately one third of the time of the simulated braking event.

* * * * *